Figures 1, 2:
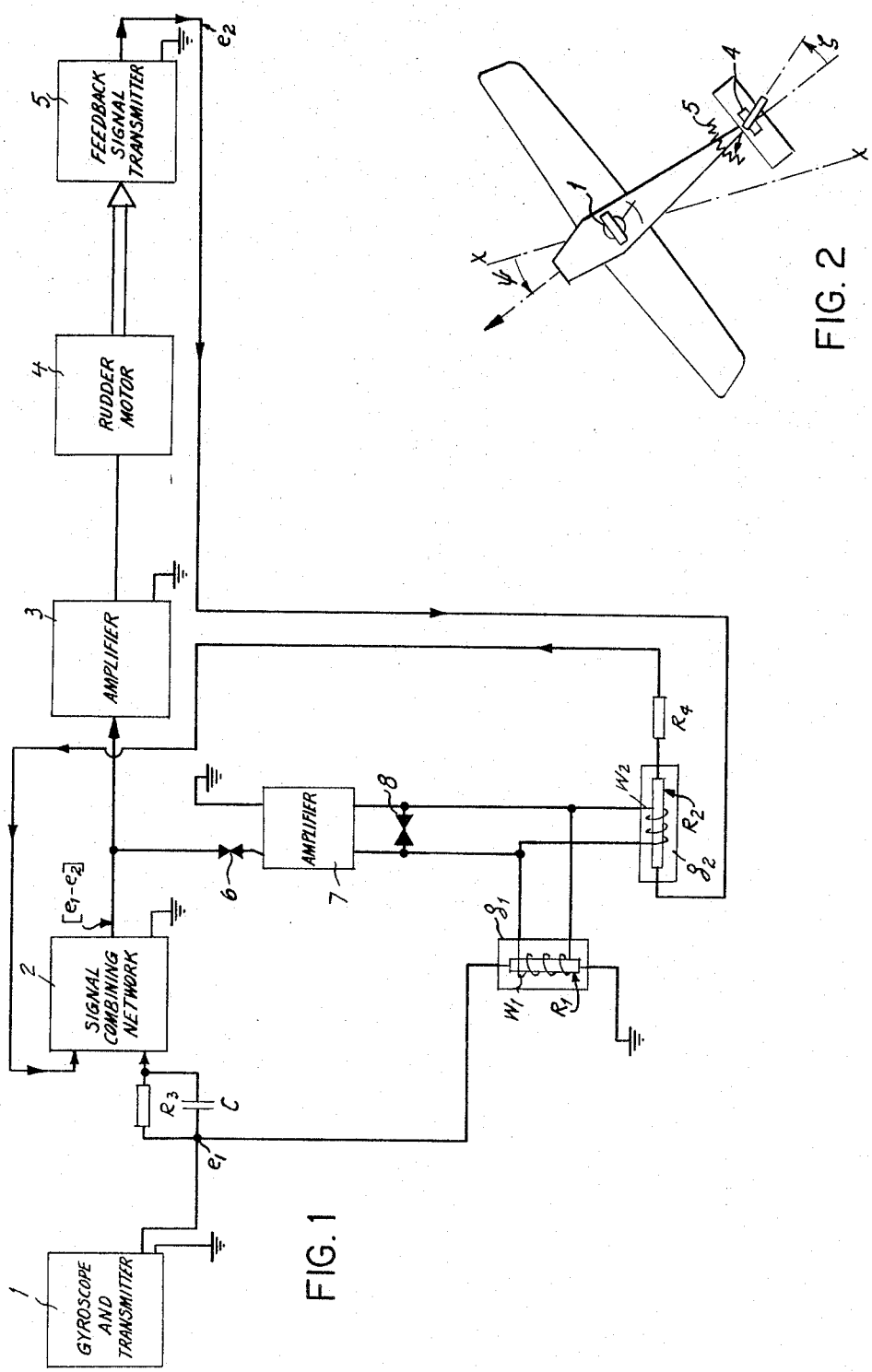

March 21, 1967 W. MÖLLER 3,310,721
STABILIZED AUTOMATIC PILOT FOR HIGH SPEED FLIGHT
Filed Oct. 22, 1963

United States Patent Office 3,310,721
Patented Mar. 21, 1967

3,310,721
STABILIZED AUTOMATIC PILOT FOR HIGH
SPEED FLIGHT
Waldemar Möller, Überlingen (Bodensee), Germany, assignor to Bodenseewerk Perkin-Elmer & Co. G.m.b.H., Überlingen (Bodensee), Germany
Filed Oct. 22, 1963, Ser. No. 318,018
8 Claims. (Cl. 318—18)

This invention relates to an automatic pilot wherein the rudder position is a function of the airplane position error $\psi$ and wherein the rate of adjustment of the rudder motor is a function of the difference of a position error signal $e_1$ and of a negative feedback signal $e_2$ corresponding to the movement of the rudder motor. Usually the signal $e_1$ and the negative feedback signal $e_2$ are opposed as electric control values, and the difference so formed is fed to the rudder motor through a power amplifier. In this way, a proportionality between the position error $\psi$ and the rudder deflection $\zeta$ is obtained, the proportionality constant being the ratio of the coefficients of the signal $e_1$ and negative feedback signal $e_2$.

With higher flight speeds, however, the frequency of stabilization increases, as is well known, and signals of higher frequencies occur. The rudder motor, due to its naturally limited maximum rate of adjustment, is no longer able to follow such signals. Thus the rudder motor cannot produce corresponding rudder deflections at the correct phase but lags with certain phase displacement. It is a well known fact that the automatic pilot becomes unstable under such circumstances, due to the phase lag of the rudder motor.

An object of the present invention is to provide an autopilot which remains stable at relatively high aircraft speeds.

The invention comprises automatically reducing the ratio of the coefficients $c_0$ and $k_0$ of respective signal $e_1$ and negative feedback signal $e_2$ with an increasing difference in the control values before the maximum admissible rate of adjustment of the rudder motor has been reached. Reducing the coefficient ratio $c_0/k_0$ means that the rudder deflection allotted to a certain position error becomes correspondingly smaller, so that the maximum rate of adjustment of the rudder motor will be sufficient to produce such a smaller rudder deflection. Thus, before the difference between the signal and the negative feedback signal $e_2$ at higher signal $e_1$ frequencies reaches a value which provides for maximum rudder motor speed, a further increase in this difference is used to control the coefficient ratio. The rudder motor can then operate at the correct phase within its limited range of rate of adjustment, although with a reduced amplitude. In order to avoid a phase lag of the rudder motor which would give rise to instability, the automatic pilot, at too large differences of the control values, operates with automatically reduced rudder amplitudes. This is quite reasonable, as at higher flight speeds the efficiency of the rudder is increased so that smaller rudder amplitudes are sufficient.

The ratio of the coefficients can be changed by changing the resistances by which the coefficients of the control values, namely of the signal $e_1$ and of the negative feedback signal $e_2$, are determined. Advantageously, an auxiliary control circuit is energized by the difference in the control values, as soon as a selected value, depending on the maximum rate of adjustment of the rudder motor, is exceeded. With this circuit, the resistances determining the coefficients of the control values are changed. Changing the coefficient resistances by the current or the voltage of the auxiliary control circuit can be achieved in various manners. For example, a moving coil or rotary magnet system are arranged in the auxiliary control circuit for actuating a shunting wiper of the coefficient resistor or by other well known means. Often it will be sufficient to change only one of the coefficient resistances, for example only the resistance determining the signal coefficient, whereas the coefficient of the negative feedback value remains unaffected.

A particularly simple construction is to connect in parallel to the $e_1$ signal input terminals a shunt resistor comprising a "hot conductor" heated by the auxiliary control circuit. A "hot conductor," as is well known, is a conductor bearing an electric heating coil and having a resistance decreasing with increasing temperature. If such a hot conductor is heated by the auxiliary control current, this results in an attenuation of the signal $e_1$. In a similar manner, the negative feedback signal $e_2$ is supplied through a hot conductor heated by the auxiliary control circuit. Upon heating of the hot conductor, the negative feedback signal $e_2$ is increased. The attenuation of the signal $e_1$ and/or the increase of the negative feedback signal $e_2$ results in a reduction of the loop gain as taught by this invention.

A useful embodiment of this invention is provided when the auxiliary control circuit comprises an amplifier having as an input the difference of the control values supplied through a blocking element which conducts only after the signal difference has exceeded a selected amount. Advantageously, the amount of signal difference at which the energization of the auxiliary control circuit begins is so selected to be about 90 percent of that control value difference at which the maximum rate of adjustment of the rudder motor is reached.

When using an amplifier in the auxiliary control circuit, it is advantageous to limit the output current at high values, in order to avoid overloading of the heating resistors of the hot conductors or of other elements effecting the resistance change. This can be achieved by appropriate dimensioning of the amplifier or by a voltage sensitive shunt connected in parallel to the output terminals of the amplifier.

In practice it has been found advantageous to provide means for causing a delayed decay of the coefficient change. For example, the hot conductors may be shielded thermically so that after having been heated they cool down with a delay of several seconds.

The features of novelty which I believe to be characteristic of my invention are set forth with particularity in the appended claims. My invention itself, however, both as to its fundamental principles and as to its particular embodiments, will best be understood by reference to the specification and accompanying drawing, in which FIG. 1 is a block diagram of a system in accordance with this invention, and FIG. 2 is a schematic view of an airplane deviating from the desired course direction $x$—$x$ by an angle $\psi$.

Referring now more particularly to FIG. 1, a signal $e_1$ corresponding to the position error of the flying object is picked-off as an electric value from a signal transmitter 1, usually comprising a gyroscopic device. The signal $e_1$ is supplied to a summation network 2 through a resistance $R_3$ to which a differentiating capacitor C may be connected in parallel. A variable resistor $R_1$ is connected as a shunt in parallel to the signal output terminal.

In FIG. 2, an airplane is shown schematically which deviates from a given course direction $x$—$x$ by an angle $\psi$. The position error $\psi$ is measured in well known manner by the gyroscopic device 1 providing a signal $e_1$ proportional to $\psi$ so that $e_1 = c_0\psi$. The coefficient $c_0$ is determined by the variable resistance $R_1$.

A negative feedback signal transmitter 5 is connected to a rudder motor 4 which, in a well known manner, produces a negative feedback signal $e_2$ proportional to the rudder deflection. This feedback signal $e_2$ is fed to the summation network 2 through a variable resistance $R_2$ and a further resistance $R_4$, and is opposed to the position error signal $e_1$. The position error $\psi$ is to be eliminated by the rudder deflection which is designated $\zeta$ in FIG. 2. The negative feedback signal is $e_2 = k_0 \zeta$. The coefficient $k_0$ is determined by the resistance $R_2$.

An electrical signal is produced at the output of the summation network 2 which corresponds to the difference of signal $e_1$ and negative feedback signal $e_2$. This difference $e_1 - e_2$ is supplied to the rudder motor 4 through a power amplifier 3. The rate of adjustment of motor 4 is thus a function of the difference $e_1 - e_2$.

In such an automatic pilot, a proportionality is to exist between the position error $\psi$ and the rudder deflection $\zeta$, the proportionality factor being the ratio of the coefficients $c_0/k_0$ $$\zeta = \frac{c_0}{k_0} \psi$$

With unchanged coefficient ratio $c_0/k_0$, this proportionality is, however, maintained only as long as the rate of adjustment of the rudder motor 4 is sufficient to follow the signal changes with the correct phase. If the signal $e_1$ is changed more quickly than the rudder motor 4 is able to follow at maximum rate of adjustment, the increase of the signal cannot be opposed at once by a corresponding increase of the negative feedback signal $e_2$, so that the difference $e_1 - e_2$ of the control values would be increased. The rudder deflection corresponding to the position error with the coefficient ratio unchanged could only be obtained with a large phase lag, and this would give rise to instability of the automatic pilot and, therefore, must be avoided.

In order to achieve a stable flight control with a limited rate of adjustment of the rudder motor 4 of the resistances $R_1$, $R_2$ determining the coefficient $c_0$ and $k_0$ must be reduced automatically in order to reduce thereby the proportionality factor $c_0/k_0$ before the difference $e_1 - e_2$ of the control values reach the amount necessary to produce the maximum rate of adjustment of the rudder motor.

This is effected by means of an auxiliary control circuit branched off between the summation network 2 and the power amplifier 3. The difference $e_1 - e_2$ is applied to the input of an amplifier 7, through a blocking element 6. The blocking element 6, which may, for example, comprise two Zener diodes antiparallelly connected, is so dimensioned that its conductivity begins only when the difference $e_1 - e_2$ has reached an amount of about 90% of the amount necessary for producing the maximum rate of adjustment of the rudder motor 4. By a further increase of $e_1 - e_2$ the amplifier 7 is supplied with input voltage and the output current thereof effects a reduction of the resistances $R_1$ and $R_2$. For this purpose the resistances $R_1$ and $R_2$ are hot conductors, the resistance of which, as is well known, is decreased if they are heated. The output current of the amplifier 7 energizes the heating coils $W_1$ and $W_2$ of these hot conductors $R_1$ and $R_2$. In order to limit the current of this auxiliary control circuit towards high values, a voltage sensitive shunt 8 may be provided, or the amplifier 7 can be designed only for a limited current output. In this way, overloading of the heating coils $W_1$ and $W_2$ is avoided. The hot conductors $R_1$ and $R_2$ with their heating coils $W_1$ and $W_2$ are shielded thermionically by a casing $\rho_1$ and $\rho_2$ so that the cooling takes place with a delay of several seconds.

By heating the resistance $R_1$, provision is made that a smaller signal $e_1$ is obtained with the same position error. Heating of the resistance $R_2$ has the effect that a certain negative feedback signal is produced at a lower rudder deflection than otherwise. Each one of these resistance changes or both have the effect of automatically adapting the automatic pilot to the flight speed and to the stabilization frequency increased thereby, making use of the maximum rate of adjustment of the rudder motor.

In the foregoing, I have described certain preferred embodiments of my invention, and the best mode presently known to me for practising the same. It should be understood, however, that modifications and changes may be made without departing from the spirit and scope thereof, as will be clear to those skilled in the art.

I claim:

1. In an aircraft having a control surface and a motor coupled to the surface for adjustment of the position of said surface, an automatic pilot comprising:

means for generating a signal $e_1$ indicative of a positional error of the aircraft and related thereto by a coefficient $c_0$, means for generating a signal $e_2$ indicative of the movement of the motor, and related thereto by a coefficient $k_0$, signal combining means for combining the signals $e_1$ and $e_2$, said signals having a ratio of coefficients $c_0/k_0$, means for adjusting the motor at a rate indicative of the resultant combination of the signals, said motor having a maximum allowable rate of adjustment for maintaining stable automatic pilot operation, and means for varying the ratio $c_0/k_0$ before said maximum allowable rate of the adjustment of the motor has been attained.

2. The automatic pilot of claim 1 wherein said means for varying the ratio $c_0/k_0$ comprises a control circuit which is adapted to be inoperative until the combination $(e_1 - e_2)$ of said signals attains a preselected level.

3. The automatic pilot according to claim 2 having a shunt comprising a hot conductor coupled in parallel to signal input terminals of said combination means, and said control circuit includes means for heating said conductor.

4. An automatic pilot according to claim 2 having a shunt comprising a first hot conductor for coupling said signal $e_1$ to said signal combining means, and means including a second hot conductor for coupling said signal $e_2$ to said signal combining means, said control circuit including means for heating said first and second said hot conductors.

5. The automatic pilot according to claim 2 having means for coupling the signal $e_2$ to said signal combining means, said coupling means including a hot conductor and said control circuit including means for heating said conductor.

6. An automatic pilot in accordance with claim 5 and including thermal shielding means for delaying a decay in the resistance of the hot control.

7. An automatic pilot in accordance with claim 2 wherein said control circuit includes an amplifier and signal level sensitive means for coupling the difference in amplitude $(e_1 - e_2)$ from said signal combining means to said amplifier.

8. An automatic pilot in accordance with claim 7 wherein said amplifier includes means for limiting the maximum output current of the amplifier.

References Cited by the Examiner

UNITED STATES PATENTS 2,945,995  7/1960  Wail _____ 318—418
3,034,032  5/1962  McWilliams _____ 318—448

ORIS L. RADER, *Primary Examiner.*

JOHN F. COUCH, *Examiner.*

B. DOBECK, *Assistant Examiner.*